US012652737B2

(12) United States Patent
Shih et al.

(10) Patent No.: US 12,652,737 B2
(45) Date of Patent: Jun. 9, 2026

(54) DRIVING DEVICE AND ELECTRONIC DEVICE

(71) Applicant: Lextar Electronics Corporation, Hsinchu City (TW)

(72) Inventors: Kai-Hsiang Shih, Hsinchu City (TW); Zheng-Shou Tung, Hsinchu City (TW); Chien-Nan Yeh, Hsinchu City (TW); Jin-Shing Tseng, Hsinchu City (TW)

(73) Assignee: Ennostar Corporation, Hsinchu City (TW)

( * ) Notice: Subject to any disclaimer, the term of this patent is extended or adjusted under 35 U.S.C. 154(b) by 121 days.

(21) Appl. No.: 18/633,423

(22) Filed: Apr. 11, 2024

(65) Prior Publication Data

US 2024/0365448 A1 Oct. 31, 2024

(30) Foreign Application Priority Data

Apr. 27, 2023 (TW) ................................ 112115687

(51) Int. Cl.
*H05B 45/325* (2020.01)
*H05B 45/12* (2020.01)

(52) U.S. Cl.
CPC ........... *H05B 45/325* (2020.01); *H05B 45/12* (2020.01)

(58) Field of Classification Search
CPC ...... H05B 45/32; H05B 45/325; H05B 45/12; H05B 47/11; H05B 47/12
See application file for complete search history.

(56) References Cited

U.S. PATENT DOCUMENTS

| | | | | |
|---|---|---|---|---|
| 10,764,975 | B2 | 9/2020 | Valentine | |
| 2019/0073944 | A1 | 3/2019 | Li | |
| 2022/0198995 | A1 * | 6/2022 | Ahmed | H10D 30/6755 |
| 2023/0208531 | A1 * | 6/2023 | Heo | H04B 10/501 398/159 |

FOREIGN PATENT DOCUMENTS

| | | | | | |
|---|---|---|---|---|---|
| CN | 103017017 | A | | 4/2013 | |
| CN | 102334972 | B | * | 4/2015 | H04N 23/74 |
| CN | 110634433 | A | | 12/2019 | |
| CN | 115472111 | A | | 12/2022 | |

* cited by examiner

*Primary Examiner* — Abdullah A Riyami
*Assistant Examiner* — Syed M Kaiser
(74) *Attorney, Agent, or Firm* — Patterson + Sheridan, LLP

(57) ABSTRACT

A driving device includes a pulse intensity modulation module, a pulse width modulation module, a pulse density modulation module, and a driving module. The pulse intensity modulation module receives an image processing signal related to a pixel and generates a pulse intensity according to the image processing signal. The pulse width modulation module receives the image processing signal and generates a pulse width according to the image processing signal. The pulse density modulation module receives the image processing signal and generates a pulse density according to the image processing signal. The driving module receives the pulse intensity, the pulse width, and the pulse density and generates a driving signal to the pixel according to the pulse intensity, the pulse width, and the pulse density.

7 Claims, 10 Drawing Sheets

DRIVING DEVICE AND ELECTRONIC DEVICE

CROSS REFERENCE TO RELATED APPLICATIONS

This application claims priority to TW Patent Application No. 112115687, filed on Apr. 27, 2023, the entirety of which is incorporated by reference herein.

BACKGROUND OF THE DISCLOSURE

Field of the Disclosure

The disclosure relates to a driving device, and in particular, to a driving device and an electronic device.

Description of the Related Art

As the technology for mass-producing display devices matures, the importance of image quality is increasing. Real colors, sufficient resolution, and a suitable display angle range are particularly important to consumers. In the epitaxy process, the epitaxial growth rate is not uniform in each region due to the process conditions. In order to achieve real colors and uniform color display images, a light-emitting diode (LED) chip may be screened by light-emitting wavelength bands before being placed on the light board so that the color of the display screen is uniform.

However, the above manner significantly decreases the utilization rate of chips, and the chips used for packaging have non-uniform light-emitting wavelengths, which causes the non-uniform color under display screens.

BRIEF SUMMARY OF THE DISCLOSURE

The disclosure provides a driving device and an electronic device, thereby modulating the pixel colors to improve the color uniformity of the image, increasing the chip utilization, decreasing production costs, and avoiding the color block problem caused by sequential packaging.

An embodiment of the disclosure provides a driving device, which includes a pulse intensity modulation module, a pulse width modulation module, a pulse density modulation module, and a driving module. The pulse intensity modulation module is configured to receive an image processing signal related to a pixel and generate a pulse intensity according to the image processing signal. The pulse width modulation module is configured to receive the image processing signal and generate a pulse width according to the image processing signal. The pulse density modulation module is configured to receive the image processing signal and generate a pulse density according to the image processing signal. The driving module is configured to receive the pulse intensity, the pulse width, and the pulse density and generate a driving signal to the pixel according to the pulse intensity, the pulse width, and the pulse density.

An embodiment of the disclosure provides an electronic device, which includes a display device and a driving device. The display device includes a pixel. The driving device includes a pulse intensity modulation module, a pulse width modulation module, a pulse density modulation module, and a driving module. The pulse intensity modulation module is configured to receive an image processing signal related to the pixel and generate a pulse intensity according to the image processing signal. The pulse width modulation module is configured to receive the image processing signal and generate a pulse width according to the image processing signal. The pulse density modulation module is configured to receive the image processing signal and generate a pulse density according to the image processing signal. The driving module is configured to receive the pulse intensity, the pulse width, and the pulse density and generate a driving signal to the pixel according to the pulse intensity, the pulse width, and the pulse density.

According to the driving device and the electronic device disclosed by the present disclosure, the pulse intensity modulation module, the pulse width modulation module, and the pulse density modulation module respectively generate the pulse intensity, the pulse width, and the pulse density according to the image processing signal related to the pixel, and the driving module generates the driving signal to the pixel according to the pulse intensity, the pulse width, and the pulse density. Therefore, the pixel colors may be modulated to improve the color uniformity of the image, the chip utilization is increased, the production cost is decreased, and the color block problem caused by sequential packaging is avoided.

BRIEF DESCRIPTION OF THE DRAWINGS

The disclosure can be fully understood by reading the subsequent detailed description and examples with references made to the accompanying drawings, wherein.

DETAILED DESCRIPTION OF THE DISCLOSURE

Technical terms of the disclosure are based on general definition in the technical field of the disclosure. If the disclosure describes or explains one or some terms, definition of the terms is based on the description or explanation of the disclosure. Each of the disclosed embodiments has one or more technical features. In possible implementation, a person skilled in the art would selectively implement all or some technical features of any embodiment of the disclosure or selectively combine all or some technical features of the embodiments of the disclosure.

In each of the following embodiments, the same reference number represents the same or a similar element or component.

Figure 1:
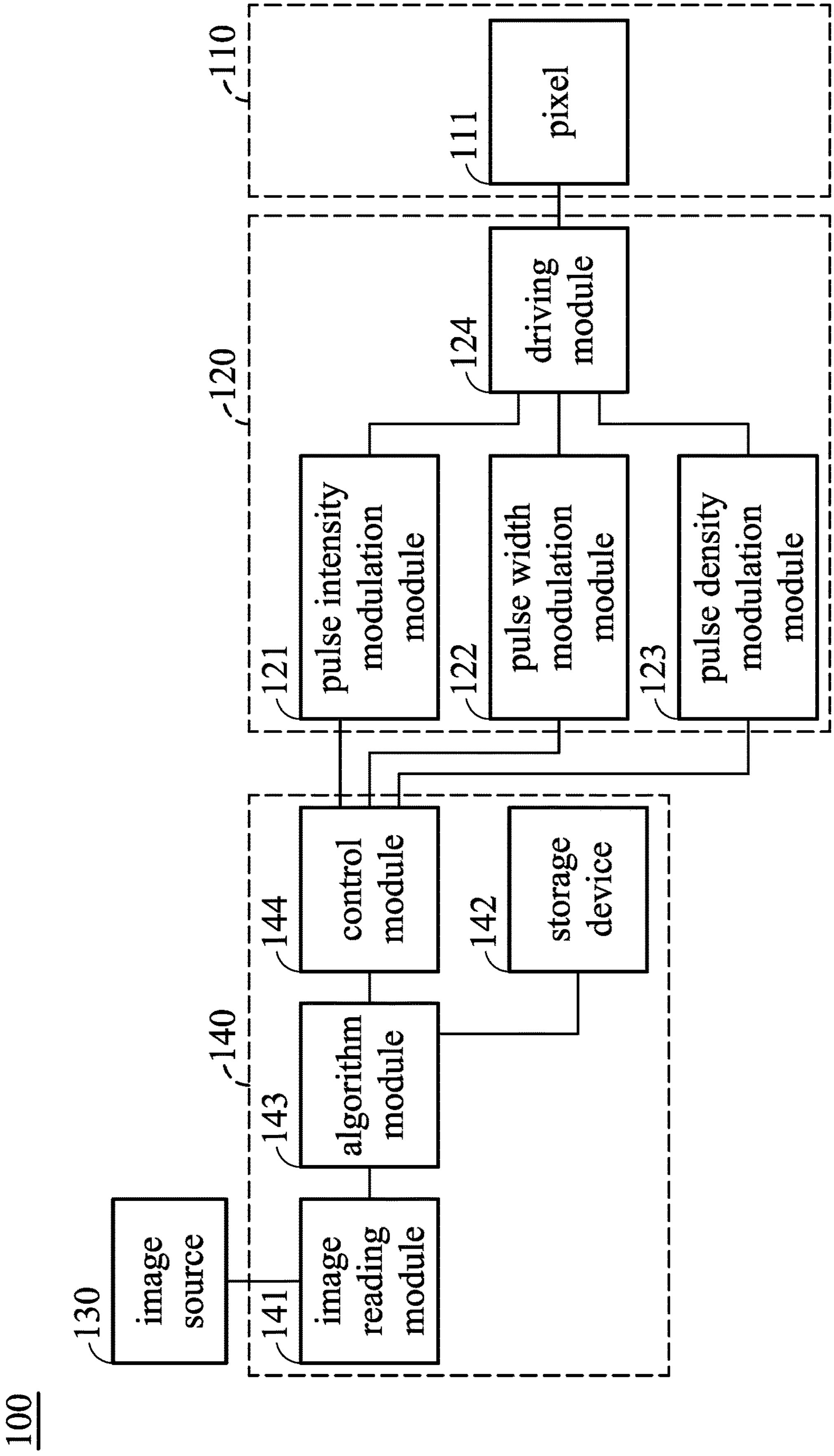
FIG. 1 is a schematic view of an electronic device according to an embodiment of the disclosure.

FIG. 1 is a schematic view of an electronic device according to an embodiment of the disclosure. In the embodiment, the electronic device 100 may be a structure after leaving the factory. Referring to FIG. 1, the electronic device 100 includes a display device 110 and a driving device 120.

The display device 110 may include a pixel 111. In FIG. 1, the number of pixel 111 is one, but the disclosure is not limited thereto. In some embodiments, the number of pixel 111 may also be multiple. In addition, the pixel 111 may be a red pixel, a blue pixel, a green pixel, or a combination thereof, but the disclosure is not limited thereto. Furthermore, the pixel 111 may include at least one light-emitting diode, and the red pixel may include, for example, a red light-emitting diode, the blue pixel may include, for example, a blue light-emitting diode, and the green pixel may include, for example, a green light-emitting diode, but the disclosure is not limited thereto. In some embodiments, the pixel 111 may be a pixel package including a light-emitting diode. In some embodiments, the pixel 111 may be a pixel package including a micro light-emitting diode. In some embodiment, the pixel 111 may be a pixel package including a red micro light-emitting diode, a green micro light-emitting diode, and a blue micro light-emitting diode.

The driving device 120 may include a pulse intensity modulation (PIM) module 121, a pulse width modulation (PWM) module 122, a pulse density modulation (PDM) module 123, and a driving module 124.

Figure 2A:
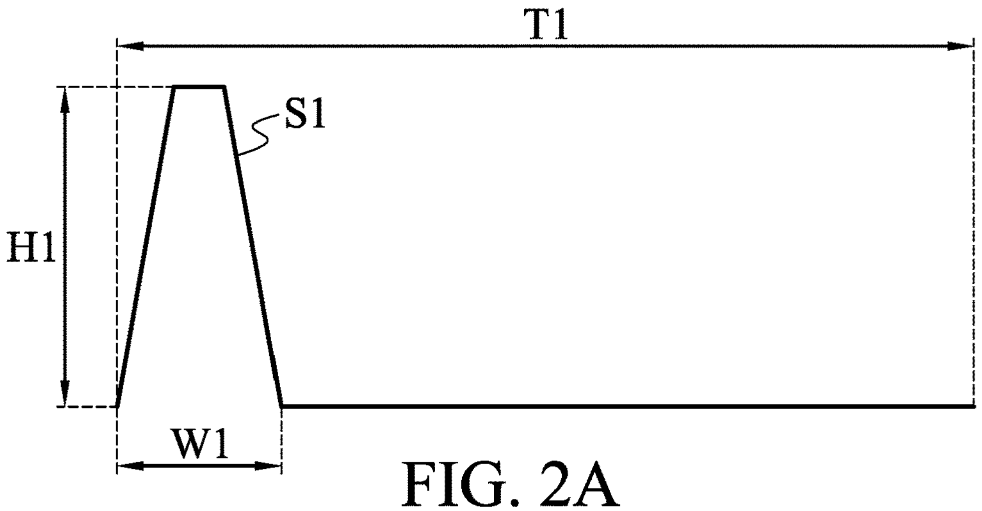
FIG. 2A is a waveform diagram of a driving signal according to an embodiment of the disclosure.
Figure 2B:
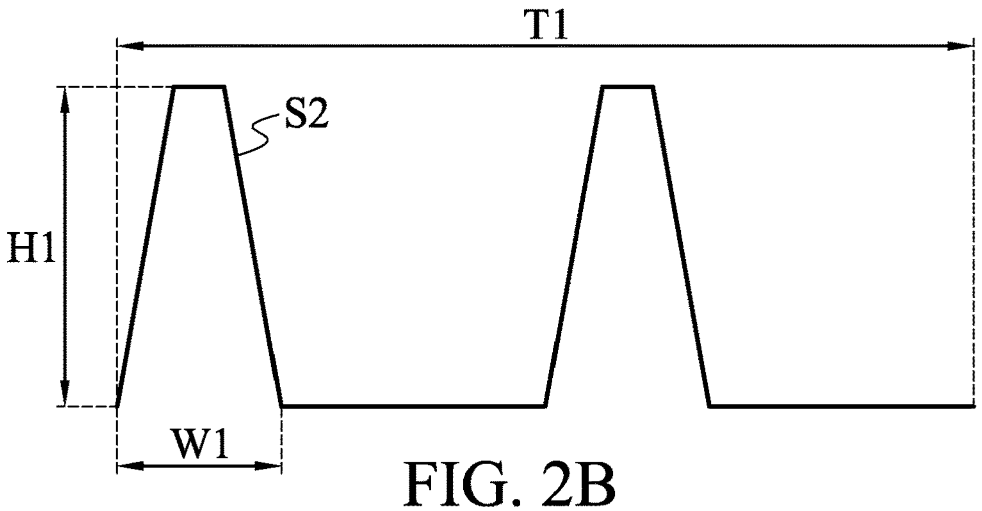
FIG. 2B is a waveform diagram of a driving signal according to another embodiment of the disclosure.
Figure 2C:
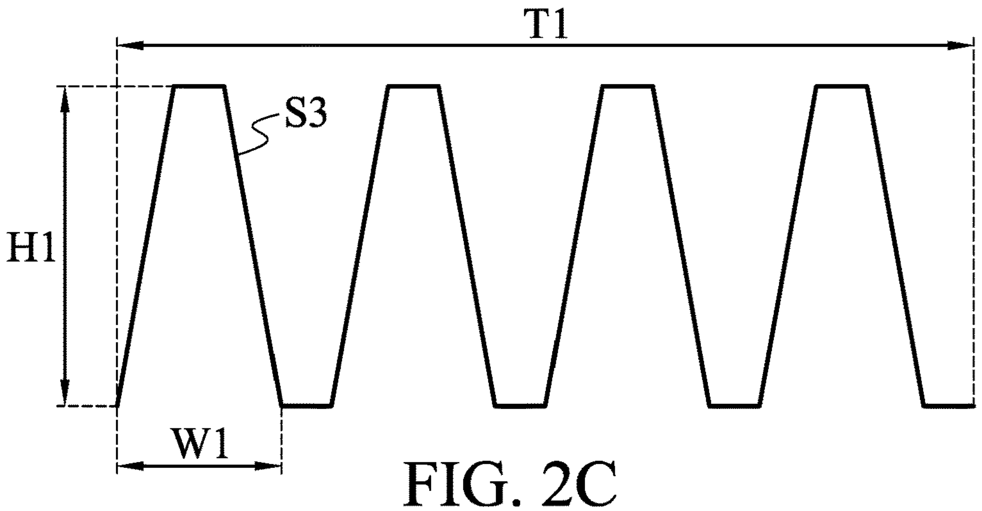
FIG. 2C is a waveform diagram of a driving signal according to another embodiment of the disclosure.

The pulse intensity modulation module 121 may receive an image processing signal related to the pixel 111 and generate a pulse intensity according to the image processing signal. In the embodiment, the pulse intensity is a height H1 of a pulse of a driving signal (as shown in FIG. 2A, FIG. 2B, or FIG. 2C), and the pulse intensity may correspond to a magnitude of a current. For example, when the pulse intensity is larger, the height H1 of the pulse of the driving signal is higher, and the magnitude of the corresponding current is also larger. When the pulse intensity is smaller, the height H1 of the pulse of the driving signal is lower, and the magnitude of the corresponding current is also smaller.

The pulse width modulation module 122 may receive the image processing signal and generate a pulse width according to the image processing signal. In the embodiment, the pulse width is a width W1 of the pulse of the driving signal (the width W1 of the pulse of the driving signal S1 in FIG. 2A, the width W2 of the pulse of the driving signal S2 in FIG. 2B, or the width W1 of the pulse of the driving signal S3 in FIG. 2C). For example, when the pulse width is larger, the width W1 of the pulse of the driving signal is wider. When the pulse width is smaller, the width W1 of the pulse of the driving signal is narrower.

The pulse density modulation module 123 may receive the image processing signal and generate a pulse density according to the image processing signal. In the embodiment, the pulse density corresponds to the number of pulses of the driving signal. For example, when the pulse density is higher, the number of pulses of the driving signal is larger (such as "four pulses" of the driving signal S3 in FIG. 2C). When the pulse density is lower, the number of pulses of the driving signal is smaller (such as "one pulse" of the driving signal S1 in FIG. 2A). When the pulse density is in the middle value, the number of pulses of the driving signal is in the middle value (such as "two pulses" of the driving signal S2 in FIG. 2B).

The driving module 124 may be coupled to the pulse intensity modulation module 121, the pulse width modulation module 122, and the pulse density modulation module 123. The driving module 124 may receive the pulse intensity, the pulse width, and the pulse density and generate a driving signal to the pixel 111 according to the pulse intensity, the pulse width, and the pulse density. In the embodiment, values of the pulse intensity and the pulse width are fixed, and a value of the pulse density is variable. That is, the driving signal 124 may generate the corresponding driving signal to the pixel 111 according to the change of pulse density. In the embodiment, the above driving signal is, for example, the driving signal S1 shown in FIG. 2A, the driving signal S2 shown in FIG. 2B or the driving signal S3 shown in FIG. 2C. The driving signal S1 shown in FIG. 2A, the driving signal S2 shown in FIG. 2B, and the driving signal S3 shown in FIG. 2C are the driving signals generated in the unit time T1.

In the embodiment, the image processing signal related to the pixel 111 may include a first target brightness of the pixel 111. In some embodiments, the pulse density is proportional to the first target brightness. When the first target brightness is larger, the pulse density generated by the pulse density modulation module 123 is larger. When the first target brightness is smaller, the pulse density generated by the pulse density modulation module 123 is smaller.

For example, it assumes that the first target brightness is 1-255 gray-levels. When the first target brightness is 1 gray-level, the values of the pulse intensity and the pulse width may be fixed (i.e., the height H1 and the width W1 of the pulse of the driving signal S1 are fixed), and the value of the pulse density is lower (such as "one pulse" of the driving signal S1 shown in FIG. 2A). When the first target brightness is 127 gray-levels, the values of the pulse intensity and the pulse width may be fixed (i.e., the height H1 and the width W1 of the pulse of the driving signal S1 are fixed), and the value of the pulse density is the middle value (such as "two pulses" of the driving signal S2 shown in FIG. 2B). When the first target brightness is 255 gray-levels, the values of the pulse intensity and the pulse width may be fixed (i.e., the height H1 and the width W1 of the pulse of the driving signal S1 are fixed), and the value of the pulse density is higher (such as "four pulses" of the driving signal S3 shown in FIG. 2C), but the disclosure is not limited thereto. In addition, when the first target brightness is 0 gray-level, it indicates that the display state of the pixel 111 is off, and there is no pulse density.

In addition, referring to FIG. 1, in the embodiment, the electronic device 100 further includes the image source 130 and the control device 140. The image source 130 may provide an image signal. In the embodiment, the image signal may include the display state of the pixel 111 of the display device 110. The control device 140 may be coupled to the image source 130 and the driving device 120. The control device 140 may receive the image signal and generate the image processing signal related to the pixel 111 according to the image signal.

Furthermore, the control device 140 may include an image reading module 141, a storage device 142, an algorithm module 143, and a control module 144. The image reading module 141 may be coupled to the image source 130. The image reading module 141 may receive the image signal and read the display state of the pixel 111 of the display device 110 included in the image signal to generate image information. The storage device 142 may store a correction value, wherein the correction value is used, for example, to set the pulse intensity and the pulse width of the driving signal. The control device 140 may provide the corresponding correction value so that the values of the pulse intensity and the pulse width may be fixed.

The algorithm module 143 may be coupled to the image reading module 141 and the storage device 142. The algorithm module 143 may receive the image information and the correction value and generate a setting signal according to the image information and the correction value. The control module 144 may be coupled to the algorithm module 143. The control module 144 may receive the setting signal to generate the image processing signal related to the pixel 111.

Furthermore, in the display process of the display device 100 performed by the electronic device 100, the values of the pulse intensity and the pulse width may be fixed, i.e., the pulse intensity and the pulse width may be set by using the correction value stored in the storage device 142, and the pulse density may be adjusted according to the image signal generated by the image source 130. In some embodiments, after the electronic device 100 leaves the factory, when the first target brightness needs to be increased, the values of the pulse intensity and the pulse width may be fixed, and the first target brightness may be increased only by increasing the value of the pulse density. When the first target brightness needs to be decreased, the values of the pulse intensity and the pulse width are still fixed, and the first target brightness may be decreased by only decreasing the value of the pulse density.

Figure 3:
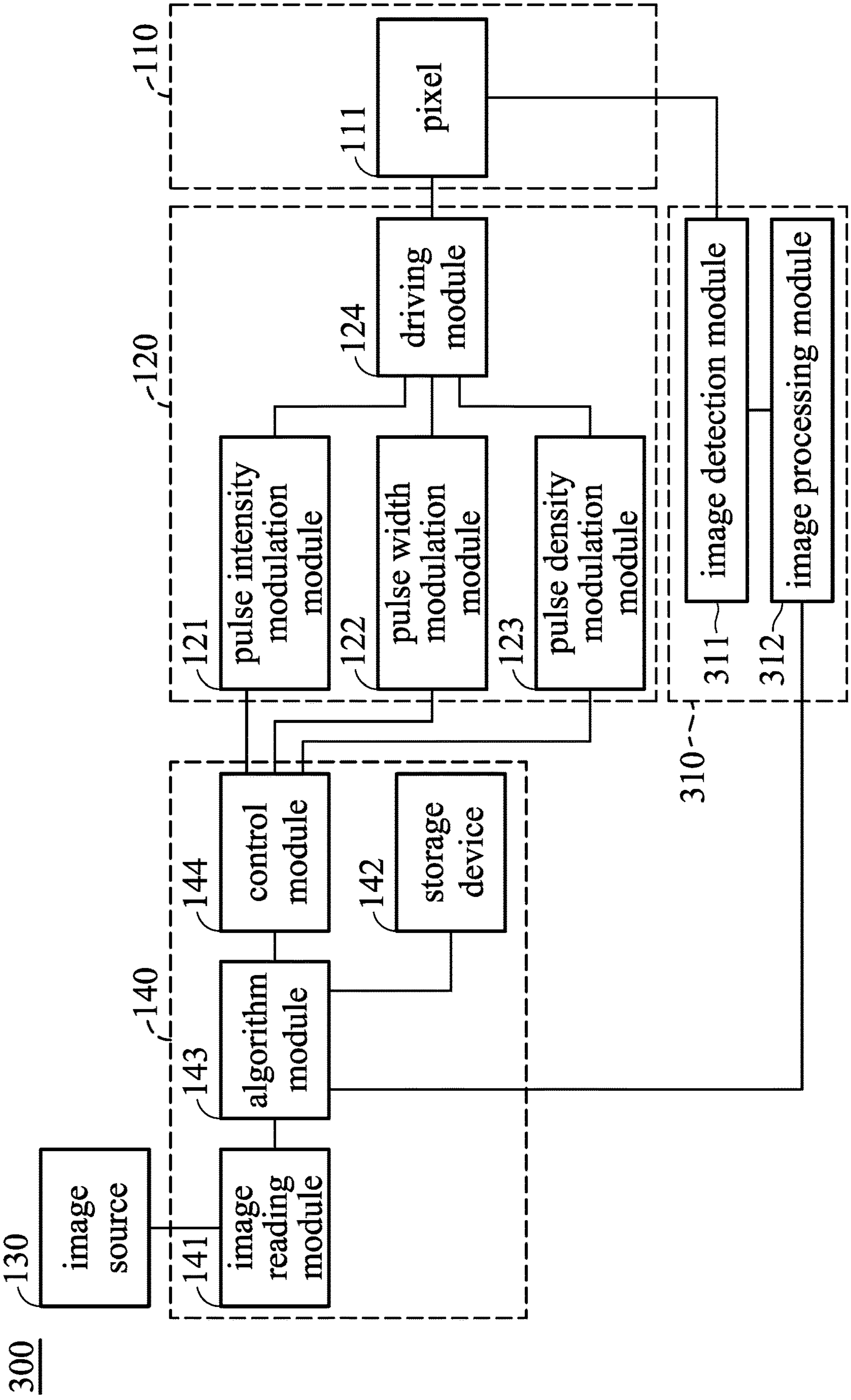
FIG. 3 is a schematic view of an electronic device according to another embodiment of the disclosure.

FIG. 3 is a schematic view of an electronic device according to another embodiment of the disclosure. In the embodiment, the electronic device 300 may be a structure before leaving the factory. Referring to FIG. 3, the electronic device 300 may include a display device 110, a driving device 120, an image source 130, a control device 140, and a detection device 310. In the embodiment, the display device 110, the driving device 120, the image source 130, the control device 140, and the internal elements thereof in FIG. 3 are the same as or similar to the display device 110, the driving device 120, the image source 130, the control device 140, and the internal elements thereof in FIG. 1. Accordingly, the display device 110, the driving device 120, the image source 130, the control device 140, and the internal elements thereof in FIG. 3 may refer to the description of the embodiment of FIG. 1 and the description thereof is not repeated herein.

In the embodiment, the value of the pulse density may be fixed, i.e., the number of pulses of the driving signal is fixed. Furthermore, the value of the density is the maximum value, i.e., in the unit time T1, the number of pulses of the driving signal is the largest, as shown in FIG. 2C. In addition, the values of the pulse intensity and the pulse width are variable. That is, the driving module 124 may generate the corresponding driving signal to the pixel 111 according to the changes of the pulse intensity and the pulse width.

Figure 4:
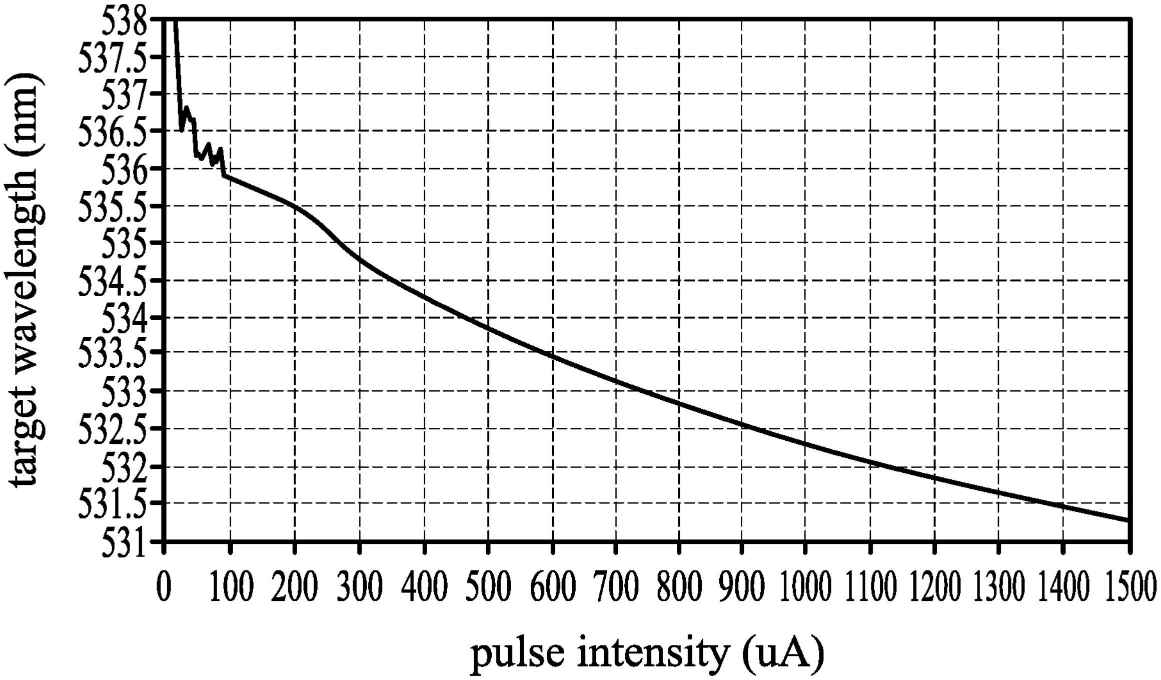
FIG. 4 is a schematic view of a corresponding relationship between a pulse intensity and a target wavelength according to an embodiment of the disclosure.

In some embodiments, the pulse intensity is inversely proportional to the target wavelength of the pixel 111. That is, when the target wavelength is larger, the pulse intensity generated by the pulse intensity modulation module 121 is smaller. When the target wavelength is smaller, the pulse intensity generated by the pulse intensity modulation module 121 is larger. For example, it assumes that the target wavelength is 531.3-538 nm and the pulse intensity is 1 uA-1500 uA, as shown in FIG. 4. When the target wavelength is 538 nm, the pulse intensity generated by the pulse intensity modulation module 121 is, for example, 1 uA. When the target wavelength is 531.3 nm, the pulse intensity generated by the pulse intensity modulation module 121 is, for example, 1500 uA, but the disclosure is not limited thereto.

In some embodiments, the pulse width is proportional to the second target brightness of the pixel 111. When the second target brightness is larger, the pulse width generated by the pulse width modulation module 122 is larger. When the second target brightness is smaller, the pulse width generated by the pulse width modulation module 122 is smaller. In addition, the above second target brightness may the maximum brightness of the display device 110, and the maximum brightness may correspond to the maximum gray-level (such as 255 gray-levels), but the disclosure is not limited thereto.

The detection device 310 may be coupled to the display device 110 and the control device 140. Furthermore, the detection device 310 may be coupled to the pixel 111 of the display device 110 and the algorithm module 143 of the control device 140. The detection device 310 may detect the target wavelength and the second target brightness of the pixel 111, generate a first detection signal according to the above target wavelength and a predetermined target wavelength and generate a second detection signal according to the above second target brightness and a predetermined target brightness.

For example, the detection device 310 may compare the target wavelength with the predetermined target wavelength to generate the first detection signal. When the detection device 310 determines that the target wavelength is greater than the predetermined target wavelength, the detection device 310 may generate the first detection signal that "the target wavelength is greater than the predetermined target wavelength." When the detection device 310 determines that the target wavelength is smaller than the predetermined target wavelength, the detection device 310 may generate the first detection signal that "the target wavelength is smaller than the predetermined target wavelength."

In addition, the detection device 310 may compare the second target brightness with the predetermined target brightness to generate the second detection signal. When the detection device 310 determines that the second target brightness is greater than the predetermined target brightness, the detection device 310 may generate the second detection signal that "the second target brightness is greater than the predetermined target brightness." When the detection device 310 determines that the second target brightness is smaller than the predetermined target brightness, the detection device 310 may generate the second detection signal that "the second target brightness is smaller than the predetermined target brightness."

The control device 140 may generate a first control signal and a second control signal according to the first detection signal and the second detection signal. That is, the algorithm module 143 may generate a first adjustment signal and a second adjustment signal to the control module 144 according to the first detection signal and the second detection signal. Then, the control module 144 may generate the first control signal and the second control signal according to the first adjustment signal and the second adjustment signal.

For example, when the control device 140 receives the first detection signal that "the target wavelength is greater than the predetermined target wavelength," the control device 140 may generate the first control signal that "the target wavelength is greater than the predetermined target wavelength." When the control device 140 receives the first detection signal that "the target wavelength is smaller than the predetermined target wavelength," the control device 140 may generate the first control signal that "the target wavelength is smaller than the predetermined target wavelength." In addition, when the control device 140 receives the second detection signal that "the second target brightness is greater than the predetermined target brightness," the control device 140 may generate the second control signal that "the second target brightness is greater than the predetermined target brightness." When the control device 140 receives the second detection signal that "the second target brightness is smaller than the predetermined target brightness," the control device 140 may generate the second control signal that "the second target brightness is smaller than the predetermined target brightness."

Then, the pulse intensity modulation module 121 may adjust the pulse intensity according to the first control signal, i.e., the pulse intensity modulation module 121 adjusts the value of the pulse intensity. For example, when the pulse intensity modulation module 121 receives the first control signal that "the target wavelength is greater than the predetermined target wavelength" (i.e., the target wavelength is greater than the predetermined target wavelength), the pulse intensity modulation module 121 may increase the pulse intensity. When the pulse intensity modulation module 121 receives the first control signal that "the target wavelength is smaller than the predetermined target wavelength" (i.e., the target wavelength is smaller than the predetermined target wavelength), the pulse intensity modulation module 121 may decrease the pulse intensity.

In addition, the pulse width modulation module 122 may adjust the pulse width according to the second control signal, i.e., the pulse width modulation module 122 adjusts the value of the pulse width. For example, when the pulse width modulation module 122 receives the second control signal that "the second target brightness is greater than the predetermined target brightness" (i.e., the second target brightness is greater than the predetermined target brightness), the pulse width modulation module 122 may decrease the pulse width. When the pulse width modulation module 122 receives the second control signal that "the second target brightness is smaller than the predetermined target brightness" (i.e., the second target brightness is smaller than the predetermined target brightness), the pulse width modulation module 122 may increase the pulse width. Afterward, the driving module 124 may adjust the driving signal according to the adjusted pulse intensity and the adjusted pulse width, i.e., the driving module 124 adjusts the height H1 and the width W1 of the pulse of the driving signal. Therefore, the target wavelength and the second target brightness generated by the pixel 111 may be consistent with the predetermined target wavelength and the predetermined target brightness so as to increase the display quality of the display device 110.

Furthermore, in the embodiment, the detection device 310 may include an image detection module 311 and an image processing module 312. The image detection module 311 may be coupled to the pixel 111 and detect the pixel 111 to generate the target wavelength and the second target brightness of the pixel 111. The image processing module 312 may be coupled to the image detection module 311 and the algorithm module 143 of the control device 140. The image processing module 312 may receive the target wavelength and the second target brightness of the pixel 111, generate the first detection signal according to the target wavelength of the pixel 111 and the predetermined target wavelength and generate the second detection signal according to the second target brightness of the pixel 111 and the predetermined target brightness.

In the embodiment, the algorithm module 143 may further generate the correction value corresponding to the first adjustment signal and/or the correction value corresponding to the second adjustment signal according to the first detection signal and/or the second detection signal and store these correction values in the storage device 142. Accordingly, the control device 140 may control the driving device 120 to generate the corresponding driving signal according to the correction value stored in the storage device 142 so that the display device 110 may display the corresponding image so as to increase the display quality of the display device 110.

Furthermore, in the detection and correction process of the target wavelength and the second target brightness of the pixel 111 performed by the electronic device 300, the pulse intensity and the pulse width may be adjusted. Moreover, in the disclosure, the difference between the electronic device 100 in FIG. 1 and the electronic device 300 in FIG. 3 is that the electronic device 300 includes the detection device 310, but the electronic device 100 does not include the detection device 310.

In some embodiments, when the electronic device 300 adjusts the pulse intensity and the pulse width, the pulse density (i.e., the number of pulses of the driving signal) in a frame (such as the unit time T1) is fixed (such as the maximum value). Therefore, when the value of the pulse width is larger, the maximum brightness (i.e., the second target brightness) of the display device 110 is larger. When the value of the pulse width is smaller, the maximum brightness (i.e., the second target brightness) of the display device 110 is lower. Therefore, the pulse width may determine the maximum brightness of the display device 110. After the pulse width determines the maximum brightness (i.e., the second target brightness) of the display device 110, if the brightness of the display device 110 (i.e., the first target brightness) needs to be decreased, the pulse density is decreased (i.e., the number of pulses of the driving signal is decreased) so as to decreased the brightness of the display device 110 (i.e., the first target brightness). If the brightness of the display device 110 (i.e., the first target brightness), the pulse density is increased (i.e., the number of pulses of the driving signal is increased) so as to increase the brightness of the display device 110 (i.e., the first target brightness). In some embodiments, after the value of the pulse width is fixed and the maximum brightness (i.e., the second target brightness) of the display device 110 is determined, the brightness of the display device 110 (i.e., the first target brightness) may be adjusted by changing the pulse density. Since the value of the pulse width is fixed, the disclosure may achieve the effect of linearly adjusting the brightness of the display device 110.

In some embodiments, the value of the pulse intensity disclosed in the disclosure is fixed so that the color corresponding to the frame displayed by the display device 110 may be more uniform so as to increase the perception of the user.

Figure 5:
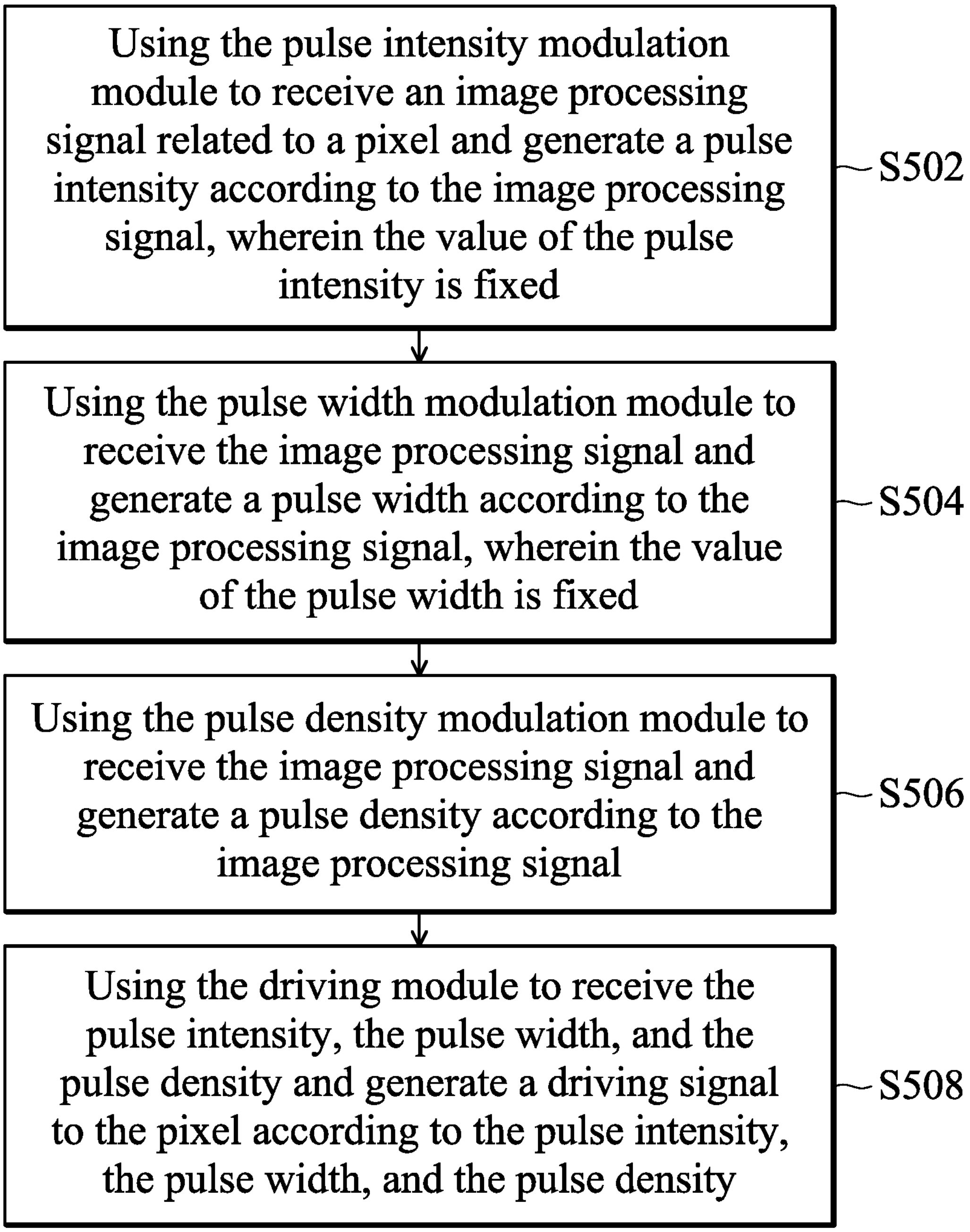
FIG. 5 is a flowchart of an operation method of an electronic device according to an embodiment of the disclosure.

FIG. 5 is a flowchart of an operation method of an electronic device according to an embodiment of the disclosure. The embodiment may correspond to the electronic device 100 in FIG. 1 (i.e., the structure after leaving the factory). In step S502, the method involves using the pulse intensity modulation module to receive an image processing signal related to a pixel and generate a pulse intensity according to the image processing signal, wherein the value of the pulse intensity is fixed. In step S504, the method involves using the pulse width modulation module to receive the image processing signal and generate a pulse width according to the image processing signal, wherein the value of the pulse width is fixed. In the embodiment, the values of the above pulse intensity and the above pulse width may be set to be fixed through the correction value stored in the storage device 142.

In step S506, the method involves using the pulse density modulation module to receive the image processing signal and generate a pulse density according to the image processing signal. Furthermore, in step S506, the pulse density modulation module may adjust the pulse density according to the image signal generated by the image source. In step S508, the method involves using the driving module to receive the pulse intensity, the pulse width, and the pulse density and generate a driving signal to the pixel according to the pulse intensity, the pulse width, and the pulse density.

Figure 6:
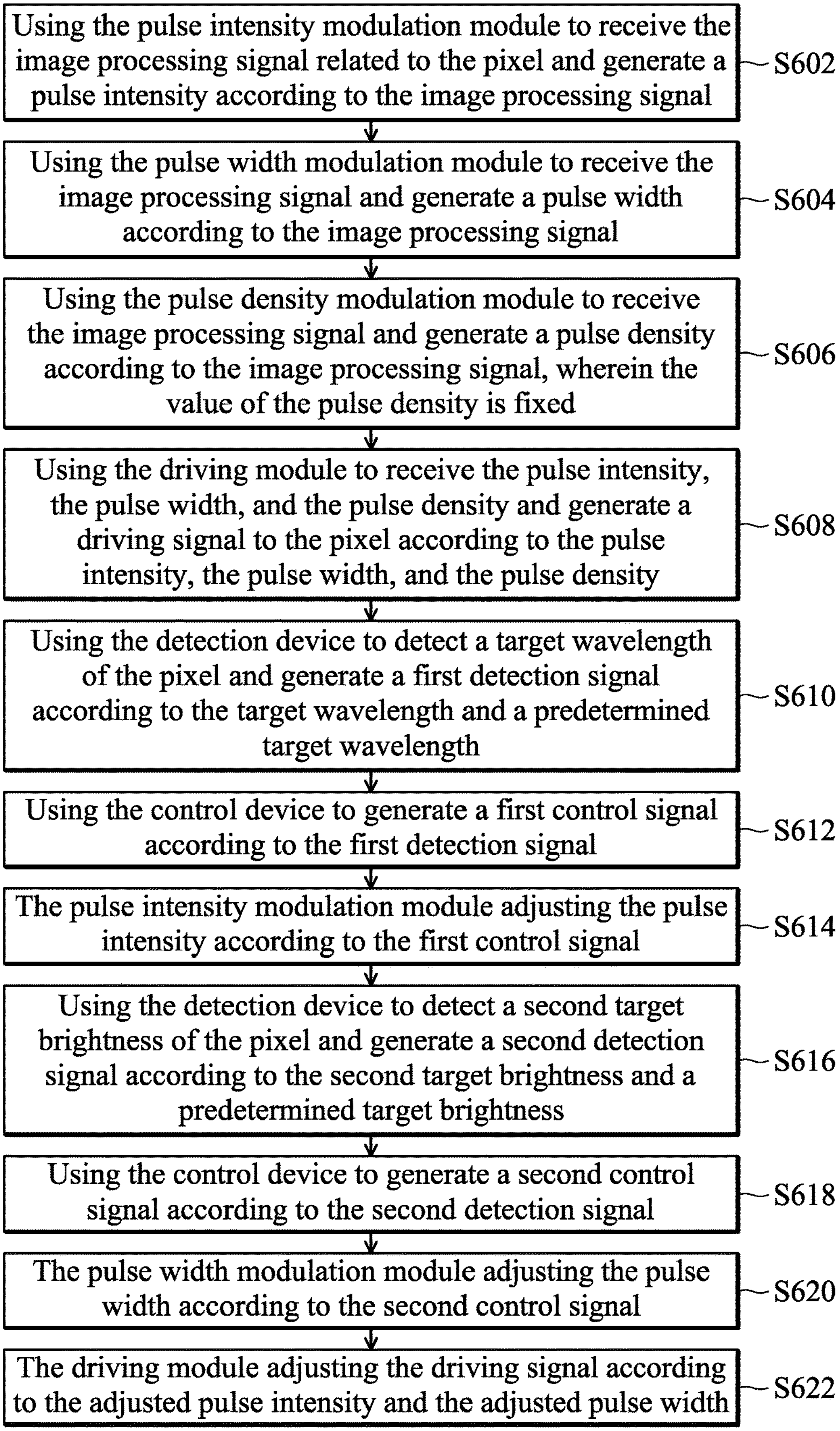
FIG. 6 is a flowchart of an operation method of an electronic device according to another embodiment of the disclosure.

FIG. 6 is a flowchart of an operation method of an electronic device according to another embodiment of the disclosure. The embodiment may correspond to the electronic device 300 in FIG. 3 (i.e., the structure before leaving the factory).

In step S602, the method involves using the pulse intensity modulation module to receive the image processing signal related to the pixel and generate a pulse intensity according to the image processing signal. In step S604, the method involves using the pulse width modulation module to receive the image processing signal and generate a pulse width according to the image processing signal.

In step S606, the method involves using the pulse density modulation module to receive the image processing signal and generate a pulse density according to the image processing signal, wherein the value of the pulse density is fixed. In step S608, the method involves using the driving module to receive the pulse intensity, the pulse width, and the pulse density and generate a driving signal to the pixel according to the pulse intensity, the pulse width, and the pulse density.

In step S610, the method involves using the detection device to detect a target wavelength of the pixel and generate a first detection signal according to the target wavelength and a predetermined target wavelength. In step S612, the method involves using the control device to generate a first control signal according to the first detection signal. In step S614, the method involves the pulse intensity modulation module adjusting the pulse intensity according to the first control signal.

In step S616, the method involves using the detection device to detect a second target brightness of the pixel and generate a second detection signal according to the second target brightness and a predetermined target brightness. In step S618, the method involves using the control device to generate a second control signal according to the second detection signal. In step S620, the method involves the pulse width modulation module adjusting the pulse width according to the second control signal. In step S622, the method involves the driving module adjusting the driving signal according to the adjusted pulse intensity and the adjusted pulse width.

In some embodiments, in the display process of the display device 110, the values of the pulse intensity and the pulse width may be fixed, and the value of the pulse density may be variable, i.e., the pulse density may be adjusted according to the image signal generated by the image source 130. For example, the control device 140 may generate the image processing signal corresponding to the required brightness (i.e., the first target brightness) according to the image signal generated by the image source 130. Then, the pulse density modulation module 123 may generate the corresponding pulse density according to the image processing signal. Afterward, the driving module 124 may generate the corresponding driving signal according to the above pulse density so that the display device 110 may display the required brightness (i.e., the first target brightness).

As mentioned above, after the pulse width determines the maximum brightness (i.e., the second target brightness) of the display device 110, since the adjusted pulse width is not changed (i.e., the value of the pulse width is fixed), if the brightness of the display device 110 (i.e., the first target brightness) needs to be decreased, the pulse density is decreased (i.e., the number of pulses of the driving signal is decreased) so as to decrease the brightness of the display device 110 (i.e., the first target brightness). If the brightness of the display device 110 (i.e., the first target brightness) needs to be increased, the pulse density is increased (i.e., the number of pulses of the driving signal is increased) so as to increase the brightness of the display device 110 (i.e., the first target brightness). Since the value of the pulse width is fixed, the disclosure may achieve the effect of linearly adjusting the brightness of the display device 110 (i.e., the first target brightness). In some embodiments, in the situation that the adjusted pulse intensity is not changed (i.e., the value of the pulse intensity is fixed), the brightness required by the display device 110 (i.e., the first target brightness) may be adjusted only by adjusting the value of the pulse density so that the color corresponding to the frame displayed by the display device 110 may be more uniform so as to increase the perception of the user.

Figure 7A:
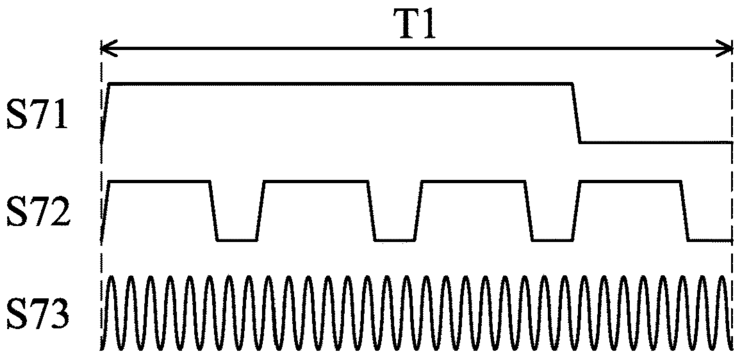
FIG. 7A is a waveform diagram of a driving signal of a traditional pulse width modulation, a driving signal of a scrambled pulse width modulation, and a driving signal of the disclosure.

FIG. 7A is a waveform diagram of a driving signal of a traditional pulse width modulation, a driving signal of a scrambled pulse width modulation, and a driving signal of the disclosure. In FIG. 7A, the reference number "S71" represents the driving signal of the traditional pulse width modulation, the reference number "S72" represents the driving signal of the scrambled pulse width modulation (S-PWM), and the reference number "S73" represents the driving signal of the disclosure. In addition, the driving signal S71, the driving signal S72, and the driving signal S73 are the driving signals generated in the unit time T1, and the duty cycle of the driving signal S71 is, for example, 80%. It can be seen from FIG. 7A that when the duty cycle is 80%, the driving signal S71 has 1 pulse, the driving signal S72 has 4 pulses, and the driving signal S73 has 32 pulses.

Figure 7B:
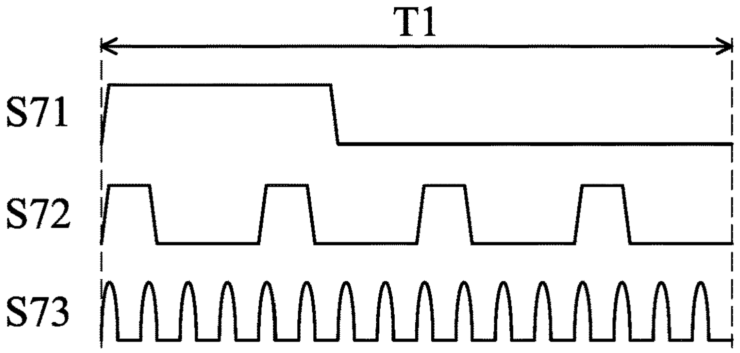
FIG. 7B is a waveform diagram of a driving signal of a traditional pulse width modulation, a driving signal of a scrambled pulse width modulation, and a driving signal of the disclosure.

FIG. 7B is a waveform diagram of a driving signal of a traditional pulse width modulation, a driving signal of a scrambled pulse width modulation, and a driving signal of the disclosure. In FIG. 7B, the driving signal S71, the driving signal S72, and the driving signal S73 are the driving signals generated in the unit time T1, and the duty cycle of the driving signal S71 is, for example, 40%. It can be seen from FIG. 7B that when the duty cycle is 40%, the driving signal S71 still has 1 pulse, the driving signal S72 still has 4 pulses, and the driving signal S73 has 16 pulses.

Figure 7C:
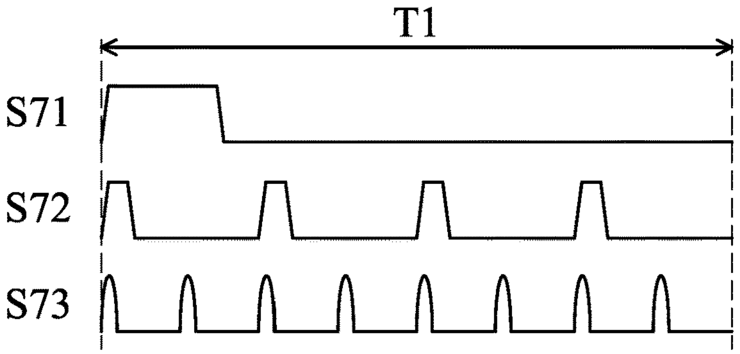
FIG. 7C is a waveform diagram of a driving signal of a traditional pulse width modulation, a driving signal of a scrambled pulse width modulation, and a driving signal of the disclosure.

FIG. 7C is a waveform diagram of a driving signal of a traditional pulse width modulation, a driving signal of a scrambled pulse width modulation, and a driving signal of the disclosure. In FIG. 7C, the driving signal S71, the driving signal S72, and the driving signal S73 are the driving signals generated in the unit time T1, and the duty cycle of the driving signal S71 is, for example, 20%. It can be seen from FIG. 7C that when the duty cycle is 20%, the driving signal S71 still has 1 pulse, the driving signal S72 still has 4 pulses, and the driving signal S73 has 8 pulses.

Figure 7D:
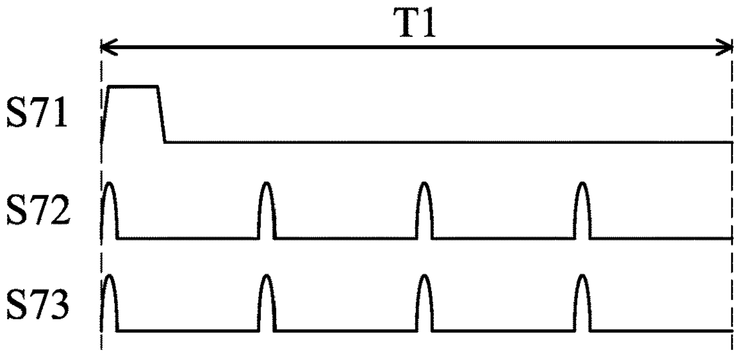
FIG. 7D is a waveform diagram of a driving signal of a traditional pulse width modulation, a driving signal of a scrambled pulse width modulation, and a driving signal of the disclosure.

FIG. 7D is a waveform diagram of a driving signal of a traditional pulse width modulation, a driving signal of a scrambled pulse width modulation, and a driving signal of the disclosure. In FIG. 7D, the driving signal S71, the driving signal S72, and the driving signal S73 are the driving signals generated in the unit time T1, and the duty cycle of the driving signal S71 is, for example, 10%. It can be seen from FIG. 7D that when the duty cycle is 10%, the driving signal S71 still has 1 pulse, the driving signal S72 still has 4 pulses, and the driving signal S73 has 4 pulses.

It can be seen from FIGS. 7A-7D that the driving signals S71 and S72 adjust the pulse widths of the driving signals S71 and S72 according to the different duty cycles. Therefore, when the duty cycle is lower, the signal off time of the driving signals S71 and S72 may be increased, which may increase the flickering of the pixels. The driving signal S73 disclosed in the disclosure may adjust the pulse density (i.e., the number of pulses) of the driving signal S73 according to the different duty cycles under the situation that the pulse intensity and the pulse width are fixed so as to effectively shorten the signal off time of the driving signal S73, thereby decreasing the flickering of the pixels. When the pulse density of the driving signal S73 is higher, the effect of improving the flickering of pixels is better. In some embodiments, the brightness of the driving signal S73 having 32 pulses in FIG. 7A is the highest, and the brightness of the driving signal S73 having four pulses in FIG. 7D is the lowest. Therefore, the brightness (such as the first target brightness) may be further adjusted by adjusting the pulse density.

Figure 8A:
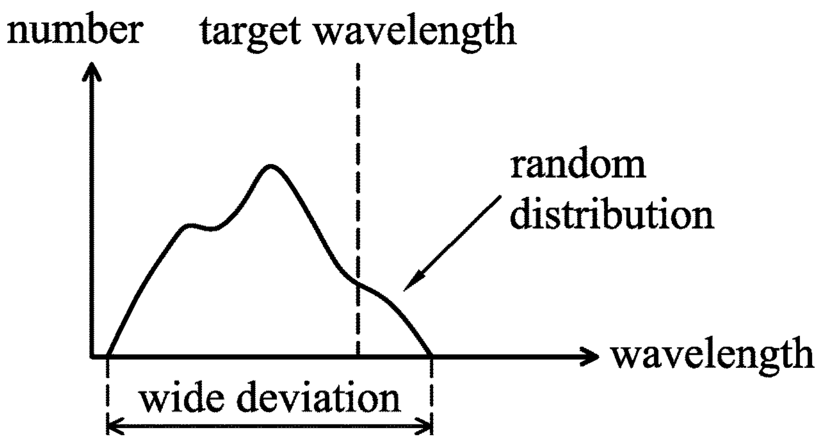
FIG. 8A is a schematic view of a corresponding relationship between a pixel number and a wavelength according to an embodiment of the disclosure.
Figure 8B:
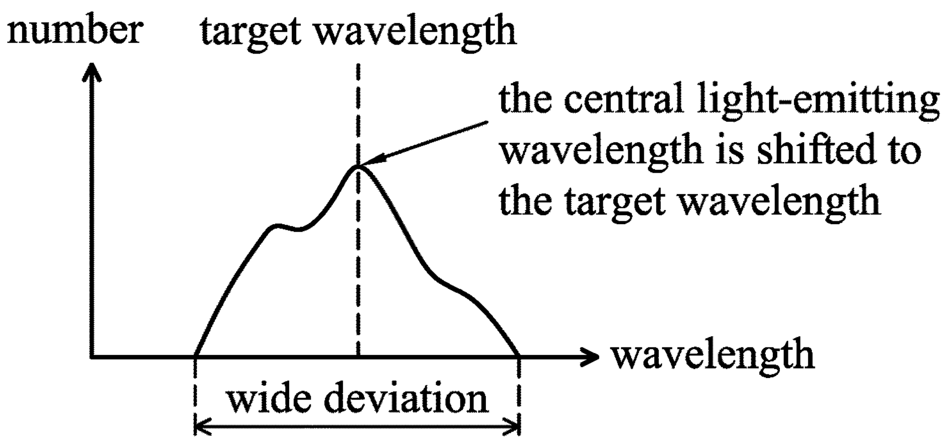
FIG. 8B is a schematic view of a corresponding relationship between a pixel number and a wavelength according to another embodiment of the disclosure.
Figure 8C:
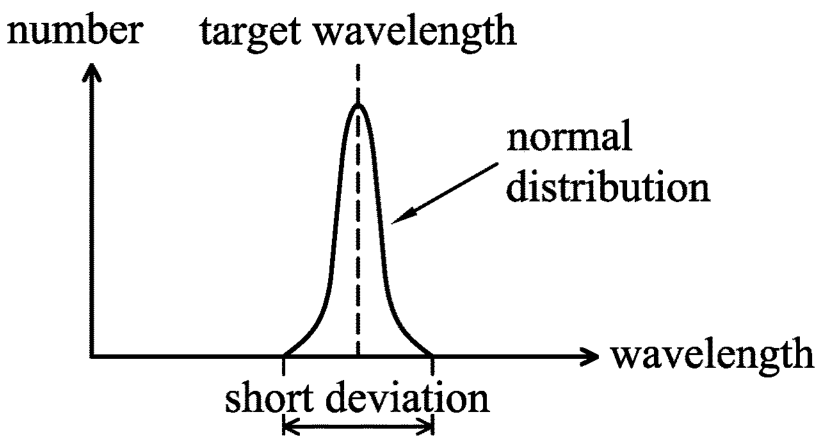
FIG. 8C is a schematic view of a corresponding relationship between a pixel number and a wavelength according to another embodiment of the disclosure.

FIG. 8A is a schematic view of a corresponding relationship between a pixel number and a wavelength according to an embodiment of the disclosure. FIG. 8B is a schematic view of a corresponding relationship between a pixel number and a wavelength according to another embodiment of the disclosure. FIG. 8C is a schematic view of a corresponding relationship between a pixel number and a wavelength according to another embodiment of the disclosure. It can be seen from FIG. 8A that the pixels of the display have not been corrected, and the distribution of the light-emitting wavelength displayed by the pixels of the display is a non-uniform state. At this time, the distribution state is an arbitrary shape (such as the random distribution), and the distribution state is wide deviation.

Then, it can be seen from FIG. 8B that by the pulse adjustment of the disclosure, for example, adjusting the whole screen current (i.e., the pulse intensity of the driving signal), the central light-emitting wavelength of the distribution state in FIG. 8A may be shifted to the target wavelength. Afterward, by the pulse adjustment of the disclosure and after adjusting the current between the pixels (i.e., the pulse intensity of the driving signal), the distribution state in FIG. 8C shows that the central light-emitting wavelength is at the target wavelength, the range of the distribution state is shortened, the distribution state is the normal distribution, and the distribution state is short deviation. Therefore, the color corresponding to the frame displayed by the display may be more uniform so as to increase the perception of the user.

Figure 9:
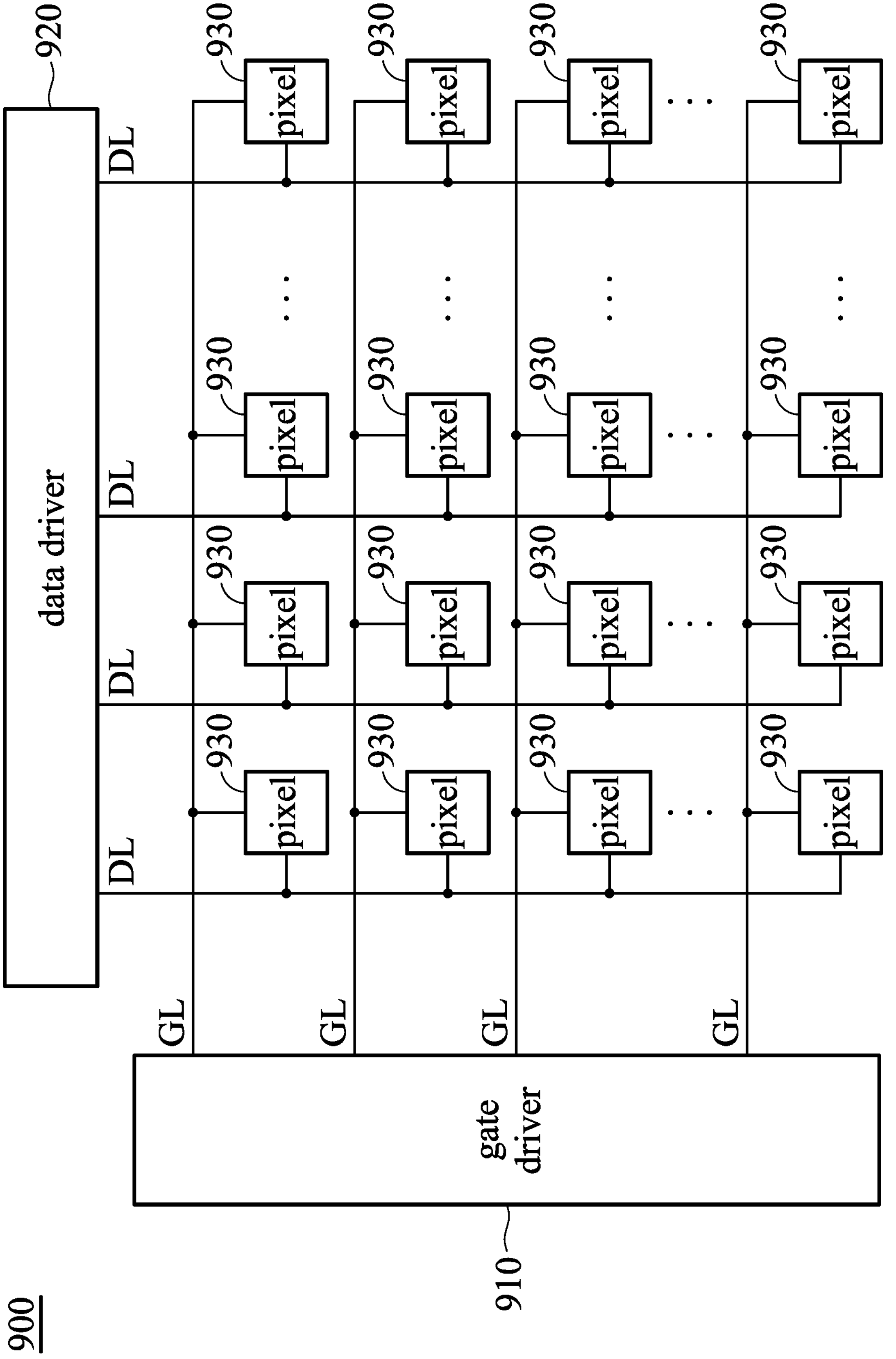
FIG. 9 is a schematic view of a display device according to an embodiment of the disclosure.

FIG. 9 is a schematic view of a display device according to an embodiment of the disclosure. In the embodiment, the display device 900 may be another exemplary embodiment of the display device 100 shown in FIG. 1 or FIG. 3. Referring to FIG. 9, the display panel 900 may include a gate driver 910, a data driver 920, a plurality of pixels 930, a plurality of data lines DL, and a plurality of scanning lines GL. The gate driver 910 is coupled to the scanning lines GL. The data driver 920 is coupled to the data lines DL. The pixels 930 in the same column are respectively coupled to the data driver 920 through one of the data lines DL. The pixels 930 in the same row are respectively coupled to the gate driver 910 through one of the scanning lines GL.

The pixels 930 may be red pixels, green pixels, and blue pixels arranged in a staggered manner. For example, the pixels 930 in the first column to the third column are the red pixels, the green pixels, and the blue pixels in sequence. The pixel 930 may include a light-emitting diode, the red pixel may include, for example, a red light-emitting diode, the blue pixel may include, for example, a blue light-emitting diode, and the green pixel may include a green light-emitting diode, but the disclosure is not limited thereto. In some embodiments, the pixels 930 may be composed of different numbers of red pixels, green pixels, and blue pixels. The number of green pixels is greater than the number of red pixels and the number of blue pixels. In some embodiments, the pixels 930 may be a periodically arranged pixel unit composed of red pixels, green pixels, and blue pixels. For example, in a 2×2 pixel unit, the red pixel, the green pixel, the green pixel, and the blue pixel are in sequence, i.e., the number of green pixels is twice the number of red pixels, and the number of green is twice the number of blue pixel. In some embodiments, the pixels 930 may be a periodically arranged pixel unit composed of red pixels, green pixels, blue pixels, and cyan pixels. For example, in a 2×2 pixel unit, the red pixel, the green pixel, the blue pixel, and the cyan pixel are in sequence. In some embodiments, the pixels 930 may be a periodically arranged pixel unit composed of red pixels, green pixels, blue pixels, and white pixels. For example, in 2×2 pixel unit, the red pixel, the green pixel, the blue pixel, and the white pixel are in sequence. In some embodiments, the pixel 930 may be a pixel package including a light-emitting diode. In some embodiments, the pixel 930 may be a pixel package including a red light-emitting diode, a blue light-emitting diode, and a green light-emitting diode. In some embodiments, the pixel 930 may be a pixel package including a micro light-emitting diode. In some embodiments, the pixel 930 may be a pixel package including a red micro light-emitting diode, a green micro light-emitting, and a blue micro light-emitting diode. In the embodiment, the pixel package further includes the driving device 120.

In some embodiments, the data driver 920 may be coupled to the driving device 120 in FIG. 1 or FIG. 3, and the data driver 920 may receive the driving signal generated by the driving module 124 of the driving device and provide the driving signal to the pixels 930 through the data lines DL. That is, the pixels 930 may share the driving device 120 (such as a separate driving chip). In addition, in some embodiments, the driving device 120 may be integrated into the data driver 920, and the same driving effect may also be achieved.

Figure 10:
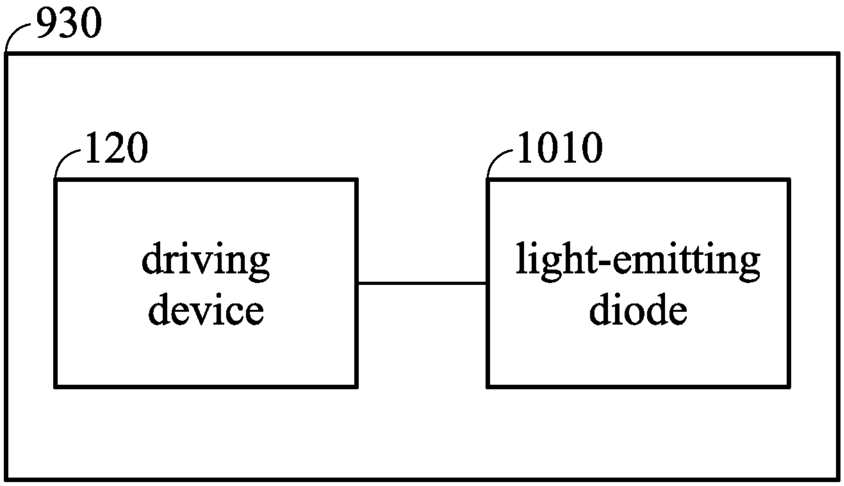
FIG. 10 is a detailed schematic view of a pixel in FIG. 9.

Furthermore, in some embodiments, there may be multiple driving devices 120, and the number of driving devices 120 may correspond to the number of pixels 930. That is, the driving devices 120 may respectively provide the driving signals to the corresponding pixels 930. Moreover, in some embodiments, the driving device 120 may be integrated into the pixel 930, as shown in FIG. 10. Referring to FIG. 10, the driving device 120 may be coupled to a light-emitting diode 1010 so as to provide the driving signal to the light-emitting diode 1010, and the same driving effect may also be achieved. In addition, the driving device 120 and the light-emitting diode 1010 may also be integrated into an independent chip so that the pixels in the display device 900 may be independently controlled and driven.

In summary, according to the driving device and the electronic device disclosed by the embodiments of the disclosure, the pulse intensity modulation module, the pulse width modulation module, and the pulse density modulation module respectively generate the pulse intensity, the pulse width, and the pulse density according to the image processing signal related to the pixel, and the driving module generates the driving signal to the pixel according to the pulse intensity, the pulse width, and the pulse density. Therefore, the pixel colors may be modulated to improve the color uniformity of the image, the chip utilization is increased, the production cost is decreased, and the color block problem caused by sequential packaging is avoided. In addition, the embodiment of the disclosure may further detect the target wavelength and the second target brightness of the pixel and generate the corresponding control signal to adjust the pulse intensity, the pulse width, and the pulse density so as to generate corresponding driving signal. Therefore, the target wavelength and the second target brightness generated by the pixel may be consistent with the predetermined target wavelength and the predetermined target brightness so as to increase the display quality of the display device.

While the disclosure has been described by way of example and in terms of the embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A driving device, comprising:

a pulse intensity modulation module, configured to receive an image processing signal related to a pixel and generate a pulse intensity according to the image processing signal;

a pulse width modulation module, configured to receive the image processing signal and generate a pulse width according to the image processing signal;

a pulse density modulation module, configured to receive the image processing signal and generate a pulse density according to the image processing signal; and a driving module, configured to receive the pulse intensity, the pulse width, and the pulse density and generate a driving signal to the pixel according to the pulse intensity, the pulse width, and the pulse density, wherein the pulse intensity has a first fixed value, the pulse width has a second fixed value, and the pulse density has a variable value.

2. An electronic device, comprising:

a display device, comprising a pixel; and a driving device, comprising:

a pulse intensity modulation module, configured to receive an image processing signal related to the pixel and generate a pulse intensity according to the image processing signal;

a pulse width modulation module, configured to receive the image processing signal and generate a pulse width according to the image processing signal;

a pulse density modulation module, configured to receive the image processing signal and generate a pulse density according to the image processing signal; and a driving module, configured to receive the pulse intensity, the pulse width, and the pulse density and generate a driving signal to the pixel according to the pulse intensity, the pulse width, and the pulse density, wherein the pulse intensity has a first fixed value, the pulse width has a second fixed value, and the pulse density has a variable value.

3. The electronic device according to claim 2, wherein the image processing signal comprises a first target brightness.

4. An electronic device comprising, a display device, comprising a pixel;

an image source, configured to provide an image signal;

a control device, configured to receive the image signal, and generate an image processing signal, wherein the control device comprises:

an image reading module, configured to receive the image signal to generate image information;

a storage device, configured to store a correction value;

an algorithm module, configured to receive the image information and the correction value and generate a setting signal; and a control module, configured to receive the setting signal to generate the image processing signal;

a driving device, comprising:

a pulse intensity modulation module, configured to receive the image processing signal, and generate a pulse intensity;

a pulse width modulation module, configured to receive the image processing signal and generate a pulse width;

a pulse density modulation module, configured to receive the image processing signal and generate a pulse density; and a driving module, configured to receive the pulse intensity, the pulse width, and the pulse density and generate a driving signal to the pixel.

5. The electronic device according to claim 4, wherein the pulse density has a fixed value, the pulse intensity has a first variable value, and the pulse width has a second variable value.

6. The electronic device according to claim 5, further comprising:

a detection device, configured to detect a target wavelength and a second target brightness of the pixel, and generate a first detection signal, a predetermined target wavelength, a second detection signal, and a predetermined target brightness;

wherein the control device is further configured to generate a first control signal and a second control signal;

wherein the pulse intensity modulation module is further configured to adjust the pulse intensity;

wherein the pulse width modulation module is further configured to adjust the pulse width; and wherein the driving module is further configured to adjust the driving signal.

7. The electronic device according to claim 6, wherein the detection device comprises:

an image detection module, configured to detect the pixel to generate the target wavelength and the second target brightness of the pixel; and an image processing module, configured to receive the target wavelength and the second target brightness of the pixel, generate the first detection signal, and generate the second detection signal.

* * * * *